US011655818B2

(12) United States Patent
Schaefer et al.

(10) Patent No.: US 11,655,818 B2
(45) Date of Patent: May 23, 2023

(54) COMPRESSOR WITH COMPLIANT SEAL

(71) Applicant: Emerson Climate Technologies, Inc., Sidney, OH (US)

(72) Inventors: James A. Schaefer, Troy, OH (US); Sumit R. Gadre, Pune (IN); Yogesh S. Mahure, Pune (IN)

(73) Assignee: Emerson Climate Technologies, Inc., Sidney, OH (US)

( * ) Notice: Subject to any disclaimer, the term of this patent is extended or adjusted under 35 U.S.C. 154(b) by 74 days.

(21) Appl. No.: 16/883,323

(22) Filed: May 26, 2020

(65) Prior Publication Data

US 2021/0372400 A1 Dec. 2, 2021

(51) Int. Cl.
*F03C 2/00* (2006.01)
*F03C 4/00* (2006.01)
(Continued)

(52) U.S. Cl.
CPC ............ *F04C 27/008* (2013.01); *F04C 2/025* (2013.01); *F04C 18/0215* (2013.01);
(Continued)

(58) Field of Classification Search
CPC .............. F04C 18/0215; F04C 15/0015; F04C 23/008; F04C 27/007; F04C 27/008;
(Continued)

(56) References Cited

U.S. PATENT DOCUMENTS 2,294,105 A 8/1942 Wallgren
2,592,082 A 4/1952 Trumpler
(Continued)

FOREIGN PATENT DOCUMENTS

CN 1060699 A 4/1992
CN 1113547 A 12/1995
(Continued)

OTHER PUBLICATIONS

KR20180065340A—Lee Mun Young et al.—Scroll Compressor—Jun. 18, 2018—Machine English Translation. (Year: 2018).*
(Continued)

*Primary Examiner* — Theresa Trieu
(74) *Attorney, Agent, or Firm* — Harness, Dickey & Pierce, P.L.C.

(57) ABSTRACT

A compressor may include a shell, first and second scroll members, a floating seal, a muffler plate, and a wear ring. The shell defines a discharge chamber and a suction chamber. The floating seal may sealingly engage the second scroll member. The muffler plate defines the discharge chamber and the suction chamber. The wear ring may sealingly engage the muffler plate and the floating seal such that the wear ring, the muffler plate, and the floating seal fluidly isolate the discharge chamber from the suction chamber. The muffler plate may include an axially facing surface that contacts the wear ring. The axially facing surface may include an annular recess. The wear ring may at least partially cover the annular recess. The annular recess may provide clearance between the muffler plate and the wear ring to allow the wear ring to deflect relative to the muffler plate during compressor operation.

18 Claims, 6 Drawing Sheets

(51) Int. Cl.
*F04C 2/00* (2006.01)
*F04C 18/00* (2006.01)
*F04C 27/00* (2006.01)
*F16J 9/22* (2006.01)
*F04C 2/02* (2006.01)
*F04C 18/02* (2006.01)
*F04C 15/00* (2006.01)
*F04C 23/00* (2006.01)

(52) U.S. Cl.
CPC .............. *F04C 27/007* (2013.01); *F16J 9/22* (2013.01); *F04C 15/0015* (2013.01); *F04C 23/008* (2013.01); *F04C 2210/26* (2013.01); *F04C 2210/261* (2013.01); *F05B 2240/57* (2013.01)

(58) Field of Classification Search
CPC .......... F16J 9/22; F16J 15/0887; F16J 15/122; F16J 15/3456
See application file for complete search history.

(56) References Cited

U.S. PATENT DOCUMENTS

| | | |
|---|---|---|
| 2,867,462 A | 1/1959 | Nielsen |
| 3,306,683 A | 2/1967 | Deuring |
| 3,511,512 A | 5/1970 | Wheelock |
| 3,600,114 A | 8/1971 | Dvorak et al. |
| 3,707,852 A | 1/1973 | Burckhardt et al. |
| 4,116,452 A | 9/1978 | Schanz |
| 4,596,520 A | 6/1986 | Arata et al. |
| 4,655,462 A | 4/1987 | Balsells |
| 4,669,737 A | 6/1987 | Diffenderfer |
| 4,869,514 A | 9/1989 | Bogdanovic |
| 4,877,382 A | 10/1989 | Caillat et al. |
| 4,940,080 A | 7/1990 | Reeves et al. |
| 4,993,928 A | 2/1991 | Fraser, Jr. |
| 5,105,879 A | 4/1992 | Ross |
| 5,156,539 A | 10/1992 | Anderson et al. |
| 5,311,748 A | 5/1994 | Bahel et al. |
| 5,342,183 A | 8/1994 | Rafalovich et al. |
| 5,407,335 A | 4/1995 | Caillat et al. |
| 5,435,707 A | 7/1995 | Hirano et al. |
| 5,447,418 A | 9/1995 | Takeda et al. |
| 5,447,420 A | 9/1995 | Caillat et al. |
| 5,494,422 A | 2/1996 | Ukai et al. |
| RE35,216 E | 4/1996 | Anderson et al. |
| 5,503,542 A | 4/1996 | Grassbaugh et al. |
| 5,540,572 A | 7/1996 | Park et al. |
| 5,562,435 A | 10/1996 | Cho et al. |
| 5,588,820 A | 12/1996 | Hill et al. |
| 5,607,288 A | 3/1997 | Wallis et al. |
| 5,613,841 A | 3/1997 | Bass et al. |
| 5,707,210 A | 1/1998 | Ramsey et al. |
| 5,800,141 A | 9/1998 | Ceylan et al. |
| 5,803,716 A | 9/1998 | Wallis et al. |
| 5,921,761 A | 7/1999 | Eckels |
| 6,027,321 A | 2/2000 | Shim et al. |
| 6,048,184 A | 4/2000 | Chang et al. |
| 6,059,549 A | 5/2000 | Tarng et al. |
| 6,077,057 A | 6/2000 | Hugenroth et al. |
| 6,095,765 A | 8/2000 | Khalifa |
| 6,135,739 A | 10/2000 | Ogawa et al. |
| 6,146,119 A | 11/2000 | Bush et al. |
| 6,164,660 A | 12/2000 | Goodman |
| 6,171,088 B1 | 1/2001 | Sun et al. |
| 6,267,565 B1 | 7/2001 | Seibel et al. |
| 6,419,457 B1 * | 7/2002 | Seibel .................. F04C 27/005 418/55.1 |
| 6,631,685 B2 * | 10/2003 | Hewitt ...................... B61F 5/32 105/206.1 |
| 6,821,092 B1 | 11/2004 | Gehret et al. |
| 6,913,448 B2 | 7/2005 | Liang et al. |
| 6,984,115 B1 | 1/2006 | Tarng et al. |
| 7,070,401 B2 | 7/2006 | Clendenin et al. |
| 7,140,851 B2 | 11/2006 | Tarng |
| 7,338,265 B2 | 3/2008 | Grassbaugh et al. |
| 7,491,045 B2 | 2/2009 | Masuda |
| 7,543,822 B2 | 6/2009 | Grimanis et al. |
| 7,568,897 B2 | 8/2009 | Grassbaugh et al. |
| 7,611,345 B2 | 11/2009 | Huang et al. |
| 8,287,257 B2 | 10/2012 | Dunaevsky |
| 8,932,036 B2 | 1/2015 | Monnier et al. |
| 9,121,276 B2 | 9/2015 | Heidecker et al. |
| 10,975,868 B2 | 4/2021 | Jorwekar et al. |
| 2002/0026806 A1 | 3/2002 | Tsuboe et al. |
| 2002/0119063 A1 | 8/2002 | Morozumi |
| 2003/0012659 A1 | 1/2003 | Seibel et al. |
| 2003/0063982 A1 | 4/2003 | Pham |
| 2004/0071571 A1 | 4/2004 | Uchida et al. |
| 2004/0136854 A1 | 7/2004 | Kimura et al. |
| 2005/0123428 A1 | 6/2005 | Uchida et al. |
| 2005/0142017 A1 | 6/2005 | Liang et al. |
| 2005/0265880 A1 | 12/2005 | Chang et al. |
| 2006/0198748 A1 | 9/2006 | Grassbaugh et al. |
| 2007/0036661 A1 | 2/2007 | Stover |
| 2007/0224071 A1 | 9/2007 | Wang |
| 2008/0101972 A1 | 5/2008 | Tarng et al. |
| 2008/0159895 A1 | 7/2008 | Huang et al. |
| 2008/0175737 A1 | 7/2008 | Grassbaugh et al. |
| 2009/0060767 A1 | 3/2009 | Zamudio |
| 2009/0098001 A1 | 4/2009 | Ni |
| 2009/0169405 A1 | 7/2009 | Suefuji et al. |
| 2009/0185926 A1 | 7/2009 | Bush |
| 2009/0185935 A1 | 7/2009 | Seibel et al. |
| 2009/0246059 A1 | 10/2009 | Nakamura et al. |
| 2010/0254841 A1 | 10/2010 | Akei et al. |
| 2010/0303659 A1 | 12/2010 | Stover et al. |
| 2011/0293456 A1 | 12/2011 | Seibel et al. |
| 2012/0148433 A1 | 6/2012 | Liang et al. |
| 2012/0258002 A1 | 10/2012 | Rose |
| 2013/0078128 A1 | 3/2013 | Akei |
| 2014/0023541 A1 | 1/2014 | Heidecker et al. |
| 2014/0271306 A1 | 9/2014 | Kim et al. |
| 2015/0316055 A1 | 11/2015 | Jin et al. |
| 2015/0316058 A1 | 11/2015 | Jin et al. |
| 2016/0025094 A1 | 1/2016 | Ignatiev et al. |
| 2019/0010944 A1 | 1/2019 | Jorwekar et al. |
| 2019/0178250 A1 | 6/2019 | DeFord et al. |

FOREIGN PATENT DOCUMENTS

| | | |
|---|---|---|
| CN | 1184894 A | 6/1998 |
| CN | 1286358 A | 3/2001 |
| CN | 1415913 A | 5/2003 |
| CN | 1576605 A | 2/2005 |
| CN | 1828022 A | 9/2006 |
| CN | 101046204 A | 10/2007 |
| CN | 102449313 A | 5/2012 |
| CN | 203214294 U | 9/2013 |
| CN | 104061157 A | 9/2014 |
| CN | 209180006 U | 7/2019 |
| EP | 0482209 A1 | 4/1992 |
| EP | 0747598 A2 | 12/1996 |
| EP | 1698784 B1 | 3/2013 |
| JP | H05149269 A | 6/1993 |
| JP | H06346871 A | 12/1994 |
| JP | H08296572 A | 11/1996 |
| KR | 20020030018 A | 4/2002 |
| KR | 20180065340 A | 6/2018 |
| RU | 2064050 C1 | 7/1996 |
| WO | WO-2009035640 A1 | 3/2009 |
| WO | WO-2016049464 A1 | 3/2016 |

OTHER PUBLICATIONS

CA Notice of Allowance regarding U.S. Appl. No. 16/025,050, dated Dec. 24, 2020.
International Search Report regarding Application No. PCT/US2021-033899 dated Sep. 6, 2021.
Written Opinion of the ISA regarding Application No. PCT/US2021/033899 dated Sep. 6, 2021.

(56) References Cited

OTHER PUBLICATIONS

U.S. Appl. No. 16/025,050, filed Jul. 2, 2018, Pavan Pralhad Jorwekar et al.
U.S. Appl. No. 16/864,987, filed May 1, 2020, James W. McBean et al.
U.S. Appl. No. 15/930,616, filed May 13, 2020, Yogesh S. Mahure.
Office Action regarding European Patent Application No. 11837109.5, dated Apr. 26, 2021.
International Search Report from the ISA regarding Application No. PCT/US2021/029179 dated Aug. 2, 2021.
Written Opinion of the ISA regarding Application No. PCT/US2021/029179 dated Aug. 2, 2021.
Written Opinion of the ISA regarding Application No. PCT/US2021/032036 dated Aug. 24, 2021.
International Search Report regarding Application No. PCT/US2021/032036 dated Aug. 24, 2021.
Office Action regarding U.S. Appl. No. 16/025,050, dated Jul. 27, 2020.
Office Action regarding Indian Patent Application No. 201824024885, dated Aug. 11, 2020.
International Search Report regarding International Application No. PCT/US2011/058128, dated Apr. 10, 2012.
Written Opinion of the International Searching Authority regarding International Application No. PCT/US2011/058128, dated Apr. 10, 2012.
Office Action regarding U.S. Appl. No. 13/283,097, dated Jan. 30, 2014.
Office Action regarding Russian Patent Application No. 2013124425, dated Jun. 9, 2014. Translation provided by Gowlings International Inc.
Office Action regarding U.S. Appl. No. 13/283,097, dated Jul. 9, 2014.
Office Action regarding Chinese Patent Application No. 201180052695.2, dated Feb. 2, 2015. Translation provided by Unitalen Attorneys at Law.
Office Action regarding Chinese Patent Application No. 201180052695.2, dated Oct. 9, 2015. Translation provided by Unitalen Attorneys at Law.
Office Action regarding Chinese Patent Application No. 201180052695.2, dated Mar. 17, 2016. Translation provided by Unitalen Attorneys at Law.
Search Report regarding European Patent Application No. 11837109.5, dated Jun. 8, 2016.
Office Action regarding European Patent Application No. 11837109.5, dated Nov. 17, 2017.
Office Action regarding Chinese Patent Application No. 201610608786.4, dated Jan. 23, 2018. Translation provided by Unitalen Attorneys at Law.
Office Action regarding Indian Patent Application No. 735/MUMNP/2013, dated Jun. 6, 2018.
Office Action regarding Chinese Patent Application No. 201610608786.4, dated Sep. 10, 2018. Translation provided by Unitalen Attorneys at Law.
Office Action regarding Chinese Patent Application No. 201810735714.5, dated Jun. 3, 2019. Translation provided by Unitalen Attorneys at Law.
Office Action regarding European Patent Application No. 11837109.5, dated Jun. 18, 2019.
Office Action regarding Chinese Patent Application No. 201810735714.5, dated Nov. 27, 2019. Translation provided by Unitalen Attorneys at Law.
Office Action regarding Indian Patent Application No. 201721023952, dated Nov. 27, 2019.
Office Action regarding European Patent Application No. 11837109.5, dated Mar. 9, 2020.
Restriction Requirement regarding U.S. Appl. No. 16/025,050, dated Jun. 5, 2020.
Non-Final Office Action regarding U.S. Appl. No. 16/864,987 dated Mar. 15, 2022.
Non-Final Office Action regarding U.S. Appl. No. 15/930,616 dated Apr. 26, 2022.
International Search Report regarding Application No. PCT/US2022/013142 dated May 3, 2022.
Written Opinion regarding Application No. PCT/US2022/013142 dated May 3, 2022.
Final Office Action regarding U.S. Appl. No. 16/864,987 dated Aug. 16, 2022.
Final Office Action regarding U.S. Appl. No. 15/930,616 dated Aug. 5, 2022.
Notice of Allowance regarding U.S. Appl. No. 15/930,616 dated Oct. 19, 2022.
Notice of Allowance regarding U.S. Appl. No. 16/864,987 dated Nov. 28, 2022.

* cited by examiner

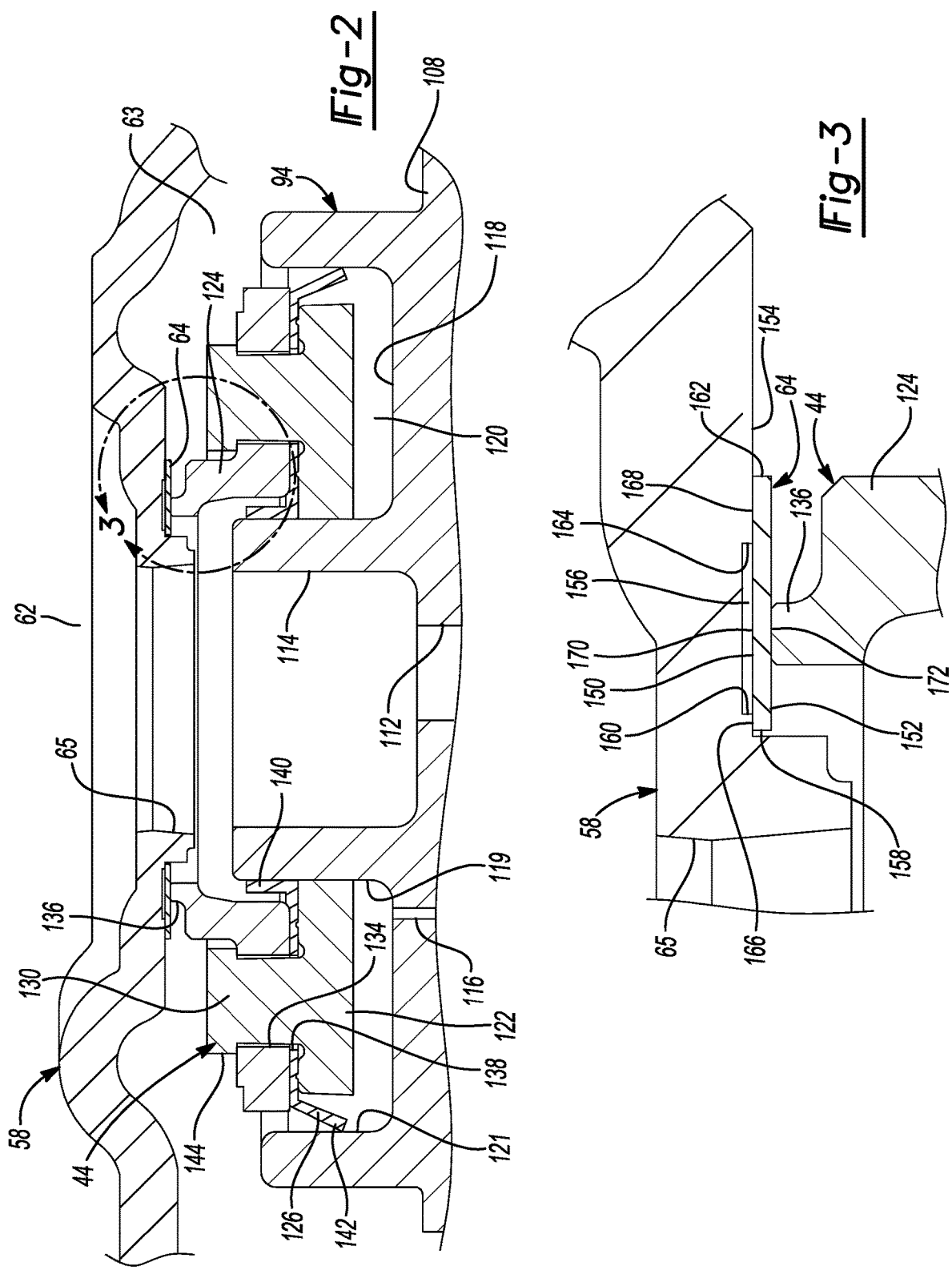

COMPRESSOR WITH COMPLIANT SEAL

FIELD

The present disclosure relates to a compressor with a compliant seal.

BACKGROUND

This section provides background information related to the present disclosure and is not necessarily prior art.

Heat-pump systems, air-conditioning systems, and other working-fluid-circulation systems may include a fluid circuit having an outdoor heat exchanger, an indoor heat exchanger, an expansion device disposed between the indoor and outdoor heat exchangers, and a compressor circulating a working fluid (e.g., refrigerant or carbon dioxide) between the indoor and outdoor heat exchangers. Efficient and reliable operation of the compressor is desirable to ensure that the heat-pump system in which the compressor is installed is capable of effectively and efficiently providing a cooling and/or heating effect on demand.

SUMMARY

This section provides a general summary of the disclosure and is not a comprehensive disclosure of its full scope or all of its features.

The present disclosure provides a compressor that may include a shell, a first scroll member, a second scroll member, a floating seal, a muffler plate, and a wear ring. The shell defines a discharge chamber and a suction chamber. The first scroll member is disposed within the shell and includes a first end plate and a first spiral wrap extending from the first end plate. The second scroll member is disposed within the shell and includes a second end plate and a second spiral wrap extending from the second end plate and meshingly engaged with the first spiral wrap. The floating seal may sealingly engage the second scroll member. The muffler plate defines the discharge chamber and the suction chamber. The wear ring may sealingly engage the muffler plate and the floating seal such that the wear ring, the muffler plate, and the floating seal fluidly isolate the discharge chamber from the suction chamber. The muffler plate may include an axially facing surface that contacts the wear ring. The axially facing surface may include an annular recess formed therein. The wear ring may at least partially cover the annular recess. The annular recess may provide clearance between the muffler plate and the wear ring to allow the wear ring to resiliently deflect relative to the muffler plate during operation of the compressor.

In some configurations of the compressor of the above paragraph, the floating seal contacts a radially intermediate portion of the wear ring that is disposed radially between a radially innermost edge of the annular recess and a radially outermost edge of the annular recess.

In some configurations of the compressor of either or both of the above paragraphs, the wear ring extends radially across the entire annular recess such that the axially facing surface contacts the wear ring at a first location disposed radially inward relative to the annular recess and at a second location disposed radially outward relative to the annular recess.

In some configurations of the compressor of any one or more of the above paragraphs, radially inner and radially outer portions of the wear ring are formed from a first material, and the radially intermediate portion of the wear ring is formed from a second material that is different from the first material.

In some configurations of the compressor of any one or more of the above paragraphs, the second material is more flexible than the first material.

In some configurations of the compressor of any one or more of the above paragraphs, the wear ring includes an annular recess defined by the radially intermediate portion of the wear ring.

In some configurations of the compressor of any one or more of the above paragraphs, the axially facing surface of the muffler plate contacts the wear ring at a location disposed radially outward relative to the annular recess.

In some configurations of the compressor of any one or more of the above paragraphs, a radially central portion of the wear ring and a radially inner portion of the wear ring are aligned with the annular recess such that the radially central and radially inner portions of the wear ring are unsupported by the muffler plate.

In some configurations of the compressor of any one or more of the above paragraphs, the axially facing surface of the muffler plate contacts the wear ring at a location disposed radially inward relative to the annular recess.

In some configurations of the compressor of any one or more of the above paragraphs, a radially central portion of the wear ring and a radially outer portion of the wear ring are aligned with the annular recess such that the radially central and radially outer portions of the wear ring are unsupported by the muffler plate.

In some configurations of the compressor of any one or more of the above paragraphs, the wear ring includes an annular recess defined by the radially intermediate portion of the wear ring.

In some configurations of the compressor of any one or more of the above paragraphs, the annular recess in the wear ring is formed in a first side of the wear ring opposite a second side of the wear ring. The floating seal contacts the second side of the wear ring.

In some configurations of the compressor of any one or more of the above paragraphs, the radially intermediate portion of the wear ring is formed from the same material as radially inner and radially outer portions of the wear ring.

In some configurations of the compressor of any one or more of the above paragraphs, the radially intermediate portion of the wear ring is thinner than radially inner and radially outer portions of the wear ring.

In another form, the present disclosure provides a compressor that may include a shell, a first scroll member, a second scroll member, a floating seal, a muffler plate, and a wear ring. The shell defines a discharge chamber and a suction chamber. The first scroll member is disposed within the shell and includes a first end plate and a first spiral wrap extending from the first end plate. The second scroll member is disposed within the shell and includes a second end plate and a second spiral wrap extending from the second end plate and meshingly engaged with the first spiral wrap. The floating seal may sealingly engage the second scroll member. The muffler plate defines the discharge chamber and the suction chamber. The wear ring may sealingly engage the muffler plate and the floating seal such that the wear ring, the muffler plate, and the floating seal fluidly isolate the discharge chamber from the suction chamber. The muffler plate may include an axially facing surface that contacts the wear ring. Radially inner and radially outer portions of the wear ring may be formed from a first material, and a radially intermediate portion of the wear ring may be formed from a second material that is different from the first material.

In some configurations of the compressor of the above paragraph, the axially facing surface includes an annular recess formed therein.

In some configurations of the compressor of any one or more of the above paragraphs, the wear ring at least partially covers the annular recess. The annular recess provides clearance between the muffler plate and the wear ring to allow the wear ring to resiliently deflect relative to the muffler plate during operation of the compressor.

In some configurations of the compressor of any one or more of the above paragraphs, the radially intermediate portion is aligned radially with the annular recess in the muffler plate.

In some configurations of the compressor of any one or more of the above paragraphs, the floating seal contacts the radially intermediate portion of the wear ring.

In some configurations of the compressor of any one or more of the above paragraphs, the radially intermediate portion is recessed from the radially inner and radially outer portions of the wear ring.

In some configurations of the compressor of any one or more of the above paragraphs, the radially intermediate portion is recessed from the radially inner and radially outer portions of the wear ring in a first side of the wear ring opposite a second side of the wear ring. The floating seal may contact the second side of the wear ring.

In some configurations of the compressor of any one or more of the above paragraphs, the radially intermediate portion is recessed from the radially inner and radially outer portions of the wear ring in the second side of the wear ring.

In some configurations of the compressor of any one or more of the above paragraphs, the radially inner, radially outer, and radially intermediate portions of the wear ring contact the axially facing surface of the muffler plate.

In some configurations of the compressor of any one or more of the above paragraphs, the second material is more flexible than the first material.

In some configurations of the compressor of any one or more of the above paragraphs, the radially intermediate portion of the wear ring is thinner than radially inner and radially outer portions of the wear ring.

In another form, the present disclosure provides a compressor that may include a shell, a first scroll member, a second scroll member, a floating seal, a muffler plate, and a wear ring. The shell defines a discharge chamber and a suction chamber. The first scroll member is disposed within the shell and includes a first end plate and a first spiral wrap extending from the first end plate. The second scroll member is disposed within the shell and includes a second end plate and a second spiral wrap extending from the second end plate and meshingly engaged with the first spiral wrap. The floating seal may sealingly engage the second scroll member. The muffler plate defines the discharge chamber and the suction chamber. The wear ring may sealingly engage the muffler plate and the floating seal such that the wear ring, the muffler plate, and the floating seal fluidly isolate the discharge chamber from the suction chamber. The muffler plate may include an axially facing surface that contacts the wear ring. A radially intermediate portion of the wear ring may define an annular recess in the wear ring.

In some configurations of the compressor of the above paragraph, the floating seal contacts a radially intermediate portion of the wear ring.

In some configurations of the compressor of any one or more of the above paragraphs, radially inner and radially outer portions of the wear ring are formed from a first material, and the radially intermediate portion of the wear ring is formed from a second material that is different from the first material.

In some configurations of the compressor of any one or more of the above paragraphs, the second material is more flexible than the first material.

In some configurations of the compressor of any one or more of the above paragraphs, the annular recess in the wear ring is formed in a first side of the wear ring opposite a second side of the wear ring. The floating seal may contact the second side of the wear ring.

In some configurations of the compressor of any one or more of the above paragraphs, the radially intermediate portion of the wear ring is thinner than radially inner and radially outer portions of the wear ring.

In some configurations of the compressor of any one or more of the above paragraphs, the axially facing surface of the muffler plate defines another annular recess that is at least partially radially aligned with the annular recess in the wear ring.

In some configurations of the compressor of any one or more of the above paragraphs, the wear ring extends radially across the entire annular recess in the muffler plate such that the axially facing surface contacts the wear ring at a first location disposed radially inward relative to the annular recesses and at a second location disposed radially outward relative to the annular recesses.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIG. 2 is a cross-sectional view of a muffler plate, wear ring, and floating seal assembly of the compressor of FIG. 1;

FIG. 3 is a cross-sectional view of a portion of the muffler plate, wear ring, and floating seal assembly of FIGS. 1 and 2;

Corresponding reference numerals indicate corresponding parts throughout the several views of the drawings.

DETAILED DESCRIPTION

Figure 1:
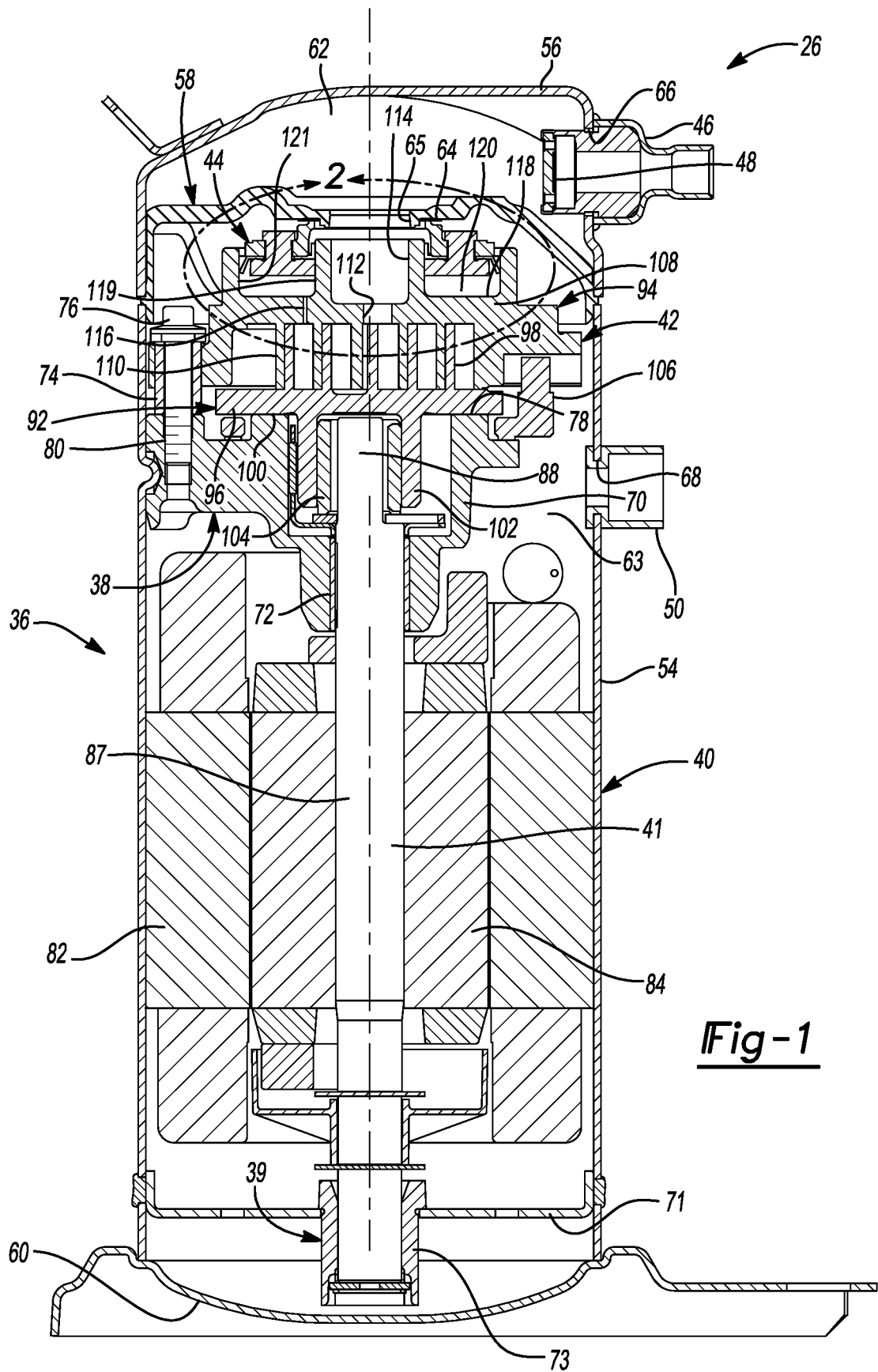
FIG. 1 is a cross-sectional view of a compressor according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a compressor 26 is provided that may include a hermetic shell assembly 36, a first bearing housing assembly 38, a second bearing housing assembly 39, a motor assembly 40, a driveshaft 41, a compression mechanism 42, and a floating seal assembly 44. The compressor 26 may compress a working fluid (e.g., a refrigerant) and circulate the working fluid throughout a vapor-compression system, for example.

The shell assembly 36 may form a compressor housing and may include a cylindrical shell 54, an end cap 56 at an upper end thereof, a transversely extending muffler plate (or partition plate) 58, and a base 60 at a lower end thereof. The end cap 56 and the muffler plate 58 may define a discharge chamber 62. The muffler plate 58 may separate the discharge chamber 62 from a suction chamber 63. The muffler plate 58 may include a wear ring 64 and a discharge passage 65 extending therethrough to provide communication between the compression mechanism 42 and the discharge chamber 62. A discharge fitting 46 may be attached to shell assembly 36 at an opening 66 in the end cap 56. A discharge valve assembly 48 can be disposed within the discharge fitting 46 and may generally prevent a reverse flow condition. A suction inlet fitting 50 may be attached to shell assembly 36 at an opening 68.

The first bearing housing assembly 38 may be fixed relative to the shell 54 and may include a main bearing housing 70, a first bearing 72, sleeve guides or bushings 74, and fasteners 76. The main bearing housing 70 may house the first bearing 72 therein and may define an annular flat thrust bearing surface 78 on an axial end surface thereof. The main bearing housing 70 may include apertures 80 receiving the fastener assemblies 76. The second bearing housing assembly 39 may be fixed relative to the shell 54 and may include a lower bearing housing 71 and a second bearing 73.

The motor assembly 40 may include a motor stator 82 and a rotor 84. The motor stator 82 may be press fit into the shell 54. The rotor 84 may be press fit on the driveshaft 41 and may transmit rotational power to the driveshaft 41. The driveshaft 41 may be rotatably supported within the first and second bearing housing assemblies 38, 39. The driveshaft 41 may include a concentric portion 87 and an eccentric crank pin 88 having a flat surface thereon. The first and second bearings 72, 73 may support (i.e., contact) the concentric portion 87 of the driveshaft 41 for rotation relative to the shell assembly 36.

The compression mechanism 42 may include an orbiting scroll 92 and a non-orbiting scroll 94. The orbiting scroll 92 may include an end plate 96 having a spiral wrap 98 on an upper surface thereof and an annular flat thrust surface 100 on a lower surface. The thrust surface 100 may interface with the annular flat thrust bearing surface 78 on the main bearing housing 70. A cylindrical hub 102 may project downwardly from thrust surface 100 and may include a drive bushing 104 disposed therein. The drive bushing 104 may receive the crank pin 88. The flat surface of the crank pin 88 may drivingly engage a flat surface in a portion of an inner bore of the drive bushing 104 to provide a radially compliant driving arrangement. An Oldham coupling 106 may be engaged with the orbiting and non-orbiting scrolls 92, 94 to prevent relative rotation therebetween.

The non-orbiting scroll 94 may include an end plate 108 and a spiral wrap 110 projecting downwardly from the end plate 108. The spiral wrap 110 may meshingly engage the spiral wrap 98 of the orbiting scroll 92, thereby creating a series of moving fluid pockets. The fluid pockets defined by the spiral wraps 98, 110 may decrease in volume as they move from a radially outer position (at a suction pressure) to a radially intermediate position (at an intermediate pressure) to a radially inner position (at a discharge pressure) throughout a compression cycle of the compression mechanism 42.

The end plate 108 may include a discharge passage 112, a discharge recess 114, an intermediate passage 116, and an annular recess 118. The discharge passage 112 is in communication with one of the fluid pockets at the radially inner position and allows compressed working fluid (at the discharge pressure) to flow through the discharge recess 114 and into the discharge chamber 62. The intermediate passage 116 may provide communication between one of the fluid pockets at the radially intermediate position and the annular recess 118. The annular recess 118 may encircle the discharge recess 114 and may be substantially concentric therewith. The annular recess 118 may include an inner surface 119 and an outer surface 121.

The annular recess 118 may at least partially receive the seal assembly 44 and may cooperate with the seal assembly 44 to define an axial biasing chamber 120 therebetween. The biasing chamber 120 receives fluid from the fluid pocket in the intermediate position through the intermediate passage 116. A pressure differential between the intermediate-pressure fluid in the biasing chamber 120 and fluid in the suction chamber 63 exerts a net axial biasing force on the non-orbiting scroll 94 urging the non-orbiting scroll 94 toward the orbiting scroll 92. In this manner, the tips of the spiral wrap 110 of the non-orbiting scroll 94 are urged into sealing engagement with the end plate 96 of the orbiting scroll 92 and the end plate 108 of the non-orbiting scroll 94 is urged into sealing engagement with the tips of the spiral wrap 98 of the orbiting scroll 92.

Referring now to FIG. 2, the floating seal assembly 44 may include an annular base plate 122, a first annular sealing member 124 and a second annular sealing member 126. The annular base plate 122 may be a generally disc-shaped member having a plurality of axially extending projections 130. The first annular sealing member 124 may include a plurality of apertures 134 and a lip portion 136 that sealingly engages the wear ring 64. The second annular sealing member 126 may include a plurality of apertures 138, a generally upwardly extending inner portion 140, and a generally outwardly and downwardly extending outer portion 142. The inner portion 140 may sealingly engage the inner surface 119 of the annular recess 118, and the outer portion 142 may sealingly engage the outer surface 121 of the annular recess 118.

Each of the plurality of axially extending projections 130 of the annular base plate 122 may be received in a corresponding one of the apertures 134 in the first annular sealing member 124 and a corresponding one of the apertures 138 in the second annular sealing member 126. Ends 144 of the projections 130 may be swaged or otherwise deformed to secure the first and second annular sealing members 124, 126 to the annular base plate 122. In some configurations, additional or alternative means may be employed to secure the first annular sealing member 124 to the annular base plate 122, such as threaded fasteners and/or welding, for example.

It will be appreciated that the floating seal assembly 44 could be configured differently from the floating seal assembly described above and shown in the figures. For example, the floating seal assembly could be similar or identical to the seal assembly disclosed in Applicant's commonly owned U.S. Patent Applicant Publication No. 2019/0010944, the disclosure of which is hereby incorporated by reference.

The wear ring 64 may be an annular, disc-shaped member that encircles the discharge passage 65 in the muffler plate 58. The wear ring 64 is disposed axially between the muffler plate 58 and the seal assembly 44. The wear ring 64 may sealingly engage the muffler plate 58 and the seal assembly 44 to seal off (or fluidly isolate) the discharge chamber 62 from the suction chamber 63.

As shown in FIG. 3, the wear ring 64 includes a first axially facing surface 150 and a second axially facing surface 152 opposite the first axially facing surface 150. The first axially facing surface 150 of the wear ring 64 may sealingly contact an annular, axially facing surface 154 of the muffler plate 58. The second axially facing surface 152 of the wear ring 64 may sealingly contact a distal tip of the lip portion 136 of the seal assembly 44.

An annular recess or relief 156 may be formed in the surface 154 of the muffler plate 58. In the configuration shown in FIGS. 1-3, the wear ring 64 covers the annular recess 156. That is, an inner diametrical surface (or radially innermost edge) 158 of the wear ring 64 is disposed radially inward relative to an inner diametrical surface (or radially innermost edge) 160 of the recess 156, and an outer diametrical surface (or radially outermost edge) 162 of the wear ring 64 is disposed radially outward relative to an outer diametrical surface (or radially outermost edge) 164 of the recess 156. In other words, the wear ring 64 shown in FIGS. 1-3 is supported by the surface 154 of the muffler plate 58 at a first location 166 adjacent the inner diametrical surface 158 of the wear ring 64 and at a second location 168 adjacent the outer diametrical surface 162 of the wear ring 64. A radially central portion 170 of the wear ring 64 may be radially aligned with the recess 156. In other words, the radially central portion 170 of the wear ring 64 may be unsupported by the muffler plate 58 to allow for deflection of the wear ring 64.

The lip portion 136 of the seal assembly 44 may contact the second axially facing surface 152 of the wear ring 64 at a location 172 (e.g., a location radially aligned with the radially central portion 170 of the wear ring 64) that is radially between the inner and outer diametrical surfaces 160, 164 of the recess 156. The recess 156 allows for some amount of compliance of the wear ring 64. That is, during operation of the compressor 26, fluid pressure within the biasing chamber 120 can force the seal assembly 44 axially against the wear ring 64, and the seal assembly 44 can resiliently deflect the wear ring 64 into the recess 156.

Such compliance or deflection of the wear ring 64 allows for adequate sealing to be maintained between the lip portion 136 of the seal assembly 44 and the wear ring 64 and between the wear ring 64 and the muffler plate 58. The compliance of the wear ring 64 into the recess 156 is especially beneficial when the surface 154 of the muffler plate 58, the wear ring 64, and/or the seal assembly 44 become distorted due to compressor assembly processes (e.g., staking, orbit forming, welding, etc.) and/or due to pressures and forces that these components are subjected to during operation of the compressor 26. The compliance of the wear ring 64 may reduce or prevent leakage between the muffler plate 58 and the wear ring 64 and between the wear ring 64 and the seal assembly 44.

The depth of the recess 156, the radial extent of the recess 156 (i.e., the radial distance between the inner and outer diametrical surfaces 160, 164 of the recess 156), the radial distance between diametrical surfaces 158, 160, the radial distance between diametrical surfaces 162, 164, the exact location of the contact point between the seal assembly 44 and the wear ring 64 relative to the recess 156, the material of the wear ring 64, and/or the thickness of the wear ring 64 can be determined (through testing and/or finite-element-analysis, for example) and selected to achieve a desired amount of deflection of the wear ring 64 for a given application. As an example, in some configurations, the depth of the recess 156 may be approximately 150 microns.

While the configuration shown in FIGS. 1-3 includes the recess 156 formed in the muffler plate 58 and the wear ring 64 being generally flat, in some configurations, the surface 154 of the muffler plate 58 could be generally flat and the first axially facing surface 150 of the wear ring 64 could include an annular recess to allow for deflection of the wear ring 64.

Figure 4:
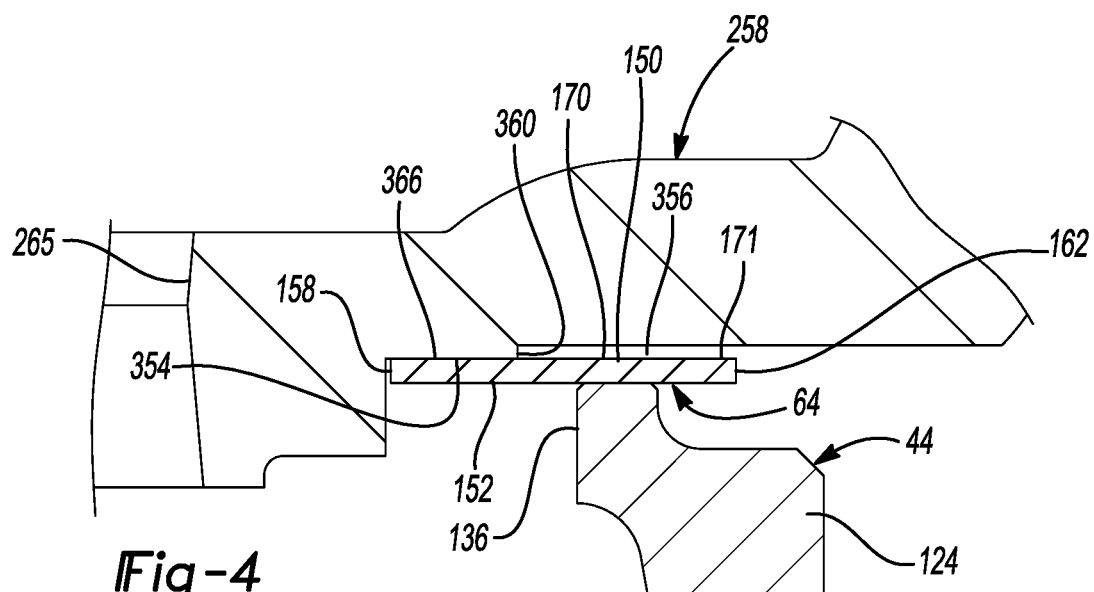
FIG. 4 is a cross-sectional view of a portion of another muffler plate, wear ring, and floating seal assembly according to the principles of the present disclosure.

Referring now to FIG. 4, an alternative muffler plate 258 is provided that could be incorporated into the compressor 26 in place of the muffler plate 58. The structure and function of the muffler plate 258 can be similar or identical to that of the muffler plate 58, apart from the differences described below.

The muffler plate 258 may include a discharge passage 265 (like the discharge passage 65) and an annular, axially facing surface 354 that encircles the discharge passage 265 and sealingly contacts the first axially facing surface 150 of the wear ring 64. An annular recess 356 may be formed in the surface 354. An inner diametrical surface 360 of the recess 356 may be disposed radially between the inner and outer diametrical surfaces 158, 162 of the wear ring 64. From its inner diametrical surface 360, the recess 356 may extend radially outward beyond the outer diametrical surface 162 of the wear ring 64. In this manner, the wear ring 64 shown in FIG. 4 may be supported by the surface 354 of the muffler plate 258 only at a first location 366 adjacent the inner diametrical surface 158 of the wear ring 64 (i.e., the first location 366 is spaced radially apart from the outer diametrical surface 162 of the wear ring 64). A radially central portion 170 and radially outer portion 171 of the wear ring 64 may be radially aligned with the recess 156. In other words, the radially central and outer portions 170, 171 of the wear ring 64 may be unsupported by the muffler plate 258 to allow for deflection of the wear ring 64. The lip portion 136 of the seal assembly 44 may contact the second axially facing surface 152 of the wear ring 64 at a location that is radially outward relative to the inner diametrical surface 360 of the recess 356.

Figure 5:
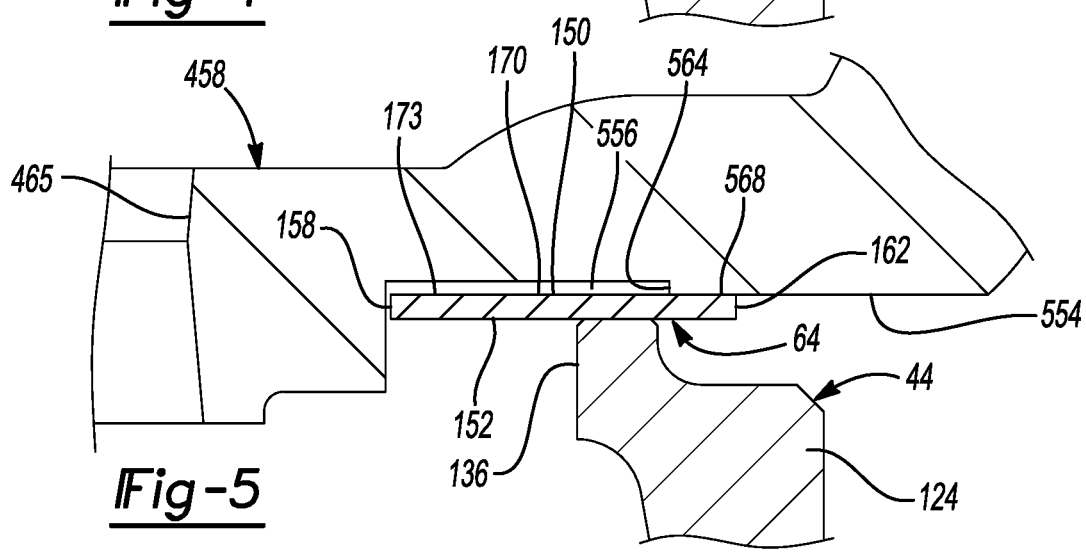
FIG. 5 is a cross-sectional view of a portion of yet another muffler plate, wear ring, and floating seal assembly according to the principles of the present disclosure.

Referring now to FIG. 5, another alternative muffler plate 458 is provided that could be incorporated into the compressor 26 in place of the muffler plate 58. The structure and function of the muffler plate 458 can be similar or identical to that of the muffler plate 58, apart from the differences described below.

The muffler plate 458 may include a discharge passage 465 (like the discharge passage 65) and an annular, axially facing surface 554 that encircles the discharge passage 465 and sealingly contacts the first axially facing surface 150 of the wear ring 64. An annular recess 556 may be formed in the surface 554. An outer diametrical surface 564 of the recess 556 may be disposed radially between the inner and outer diametrical surfaces 158, 162 of the wear ring 64. From its outer diametrical surface 564, the recess 556 may extend radially inward beyond the inner diametrical surface 158 of the wear ring 64. In this manner, the wear ring 64 shown in FIG. 5 may be supported by the surface 554 of the muffler plate 458 only at a location 568 adjacent the outer diametrical surface 162 of the wear ring 64 (i.e., the location 568 is spaced radially apart from the inner diametrical surface 158 of the wear ring 64). A radially central portion 170 and radially inner portion 173 of the wear ring 64 may be radially aligned with the recess 556. In other words, the radially central and inner portions 170, 173 of the wear ring 64 may be unsupported by the muffler plate 458 to allow for deflection of the wear ring 64. The lip portion 136 of the seal assembly 44 may contact the second axially facing surface 152 of the wear ring 64 at a location that is radially inward relative to the outer diametrical surface 564 of the recess 556.

Figure 6:
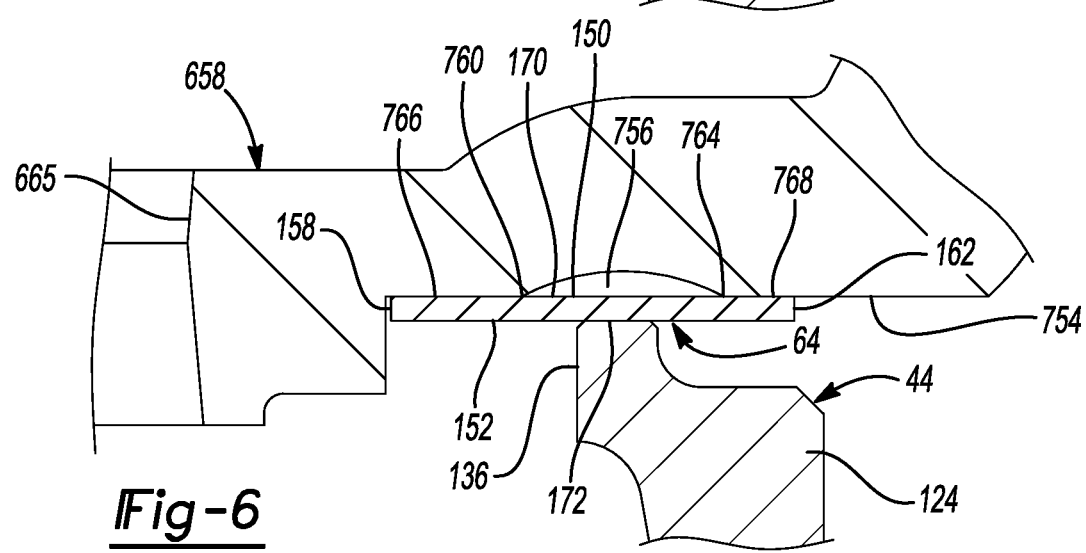
FIG. 6 is a cross-sectional view of a portion of yet another muffler plate, wear ring, and floating seal assembly according to the principles of the present disclosure.

Referring now to FIG. 6, another alternative muffler plate 658 is provided that could be incorporated into the compressor 26 in place of the muffler plate 58. The structure and function of the muffler plate 658 can be similar or identical to that of the muffler plate 58, apart from any differences described below.

The muffler plate 658 may include a discharge passage 665 (like the discharge passage 65) and an annular, axially facing surface 754 that encircles the discharge passage 665 and sealingly contacts the first axially facing surface 150 of the wear ring 64. An annular recess 756 may be formed in the surface 754. The recess 756 may have a curved, concave cross section. The cross section of the recess 756 can be generally U-shaped, for example.

In the configuration shown in FIG. 6, the wear ring 64 covers the annular recess 756. That is, the inner diametrical surface 158 of the wear ring 64 is disposed radially inward relative to a radially innermost edge 760 of the recess 756, and the outer diametrical surface 162 of the wear ring 64 is disposed radially outward relative to a radially outermost edge 764 of the recess 756. In other words, the wear ring 64 shown in FIG. 6 is supported by the surface 754 of the muffler plate 658 at a first location 766 between the inner diametrical surface 158 of the wear ring 64 and the radially innermost edge 760 of the recess 756 and at a second location 768 between the outer diametrical surface 162 of the wear ring 64 and the radially outermost edge 764 of the recess 756. A radially central portion 170 of the wear ring 64 may be radially aligned with the recess 756. In other words, the radially central portion 170 of the wear ring 64 may be unsupported by the muffler plate 658 to allow for deflection of the wear ring 64. The lip portion 136 of the seal assembly 44 may contact the second axially facing surface 152 of the wear ring 64 at a location 172 (e.g., a location radially aligned with the radially central portion 170 of the wear ring 64) that is radially between the radially innermost and outermost edges 760, 764 of the recess 756.

Figure 7:
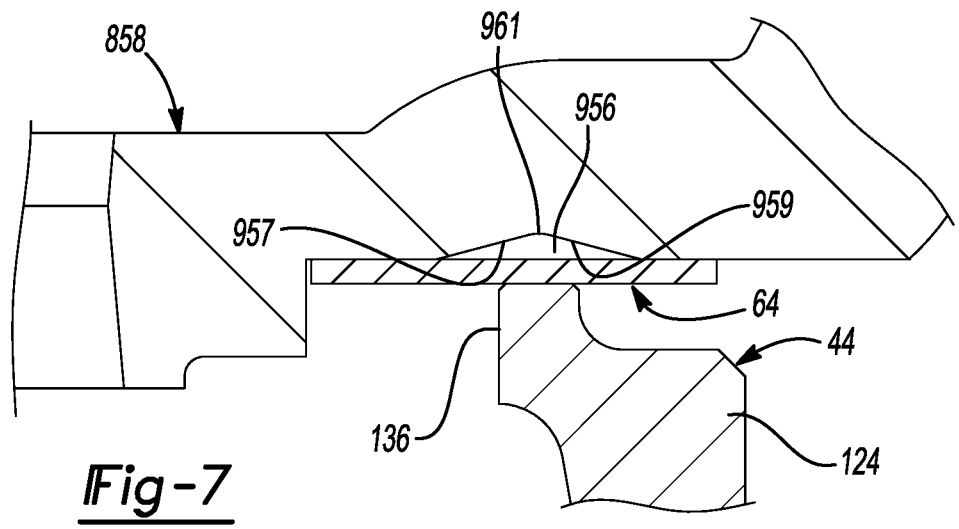
FIG. 7 is a cross-sectional view of a portion of yet another muffler plate, wear ring, and floating seal assembly according to the principles of the present disclosure.

FIG. 7 depicts yet another alternative muffler plate 858 that could be incorporated into the compressor 26 in place of the muffler plate 58. The structure and function of the muffler plate 858 can be similar or identical to that of the muffler plate 58, 658, apart from differences described below. The muffler plate 858 includes a recess 956 that may be similar or identical to the recess 156, 756, except the cross-sectional shape of the recess 956 is generally V-shaped (i.e., the recess 956 is defined by generally flat, angled surfaces 957, 959. The lip portion 136 of the seal assembly 44 may be generally aligned with an intersection 961 of the surfaces 957, 959.

Figure 8:
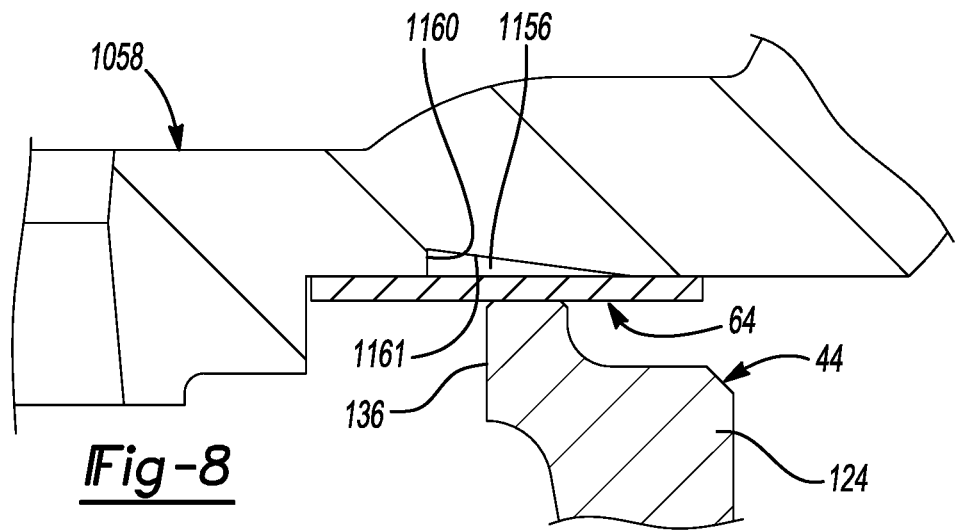
FIG. 8 is a cross-sectional view of a portion of yet another muffler plate, wear ring, and floating seal assembly according to the principles of the present disclosure.

FIG. 8 depicts yet another alternative muffler plate 1058 that could be incorporated into the compressor 26 in place of the muffler plate 58. The structure and function of the muffler plate 1058 can be similar or identical to that of the muffler plate 58, 658, 858, apart from differences described below. The muffler plate 1058 includes a recess 1156 that may be similar or identical to the recess 156, 756, 956, except the cross-sectional shape of the recess 1156 is defined by an inner diametrical surface 1160 and generally flat, angled surface 1161. The lip portion 136 of the seal assembly 44 may be generally aligned in a radial direction with the angled surface 1161.

Figure 9:
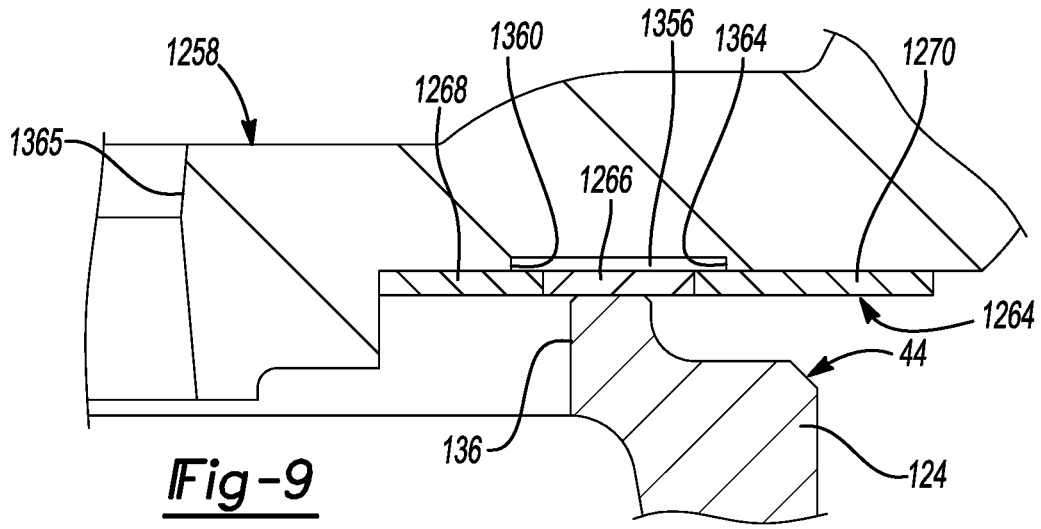
FIG. 9 is a cross-sectional view of a portion of yet another muffler plate, wear ring, and floating seal assembly according to the principles of the present disclosure.

Referring now to FIG. 9, an alternative muffler plate 1258 and an alternative wear ring 1264 are provided that could be incorporated into the compressor 26 in place of the muffler plate 58 and wear ring 64. The structure and function of the muffler plate 1258 can be similar or identical to that of the muffler plate 58 (e.g., with a discharge passage 1365 and recess 1356 that may be similar or identical to the discharge passage 65 and recess 156, 356, 556, 756, 956, 1156).

The structure and function of the wear ring 1264 can be similar or identical to that of the wear ring 64, except the wear ring 1264 is a bi-material wear ring 1264 having a radially intermediate portion 1266 that is formed from a different material than radially inner and outer portions 1268, 1270 of the wear ring 1264. In some configurations, the radially inner and outer portions 1268, 1270 may be formed from a first material (e.g., a first metallic material), and the radially intermediate portion 1266 may be formed from a second material (e.g., a second metallic, polymeric, or composite material). The second material may be a softer and/or more flexible material than the first material. The radially intermediate portion 1266 may be partially or entirely disposed radially between inner and outer diametrical surfaces (or innermost and outermost edges) 1360, 1364 of the recess 1356. The lip portion 136 of the seal assembly 44 may contact the radially intermediate portion 1266 of the wear ring 1264. The radially intermediate portion 1266 being formed from a more flexible material allows for a greater amount of deflection.

Figure 10:
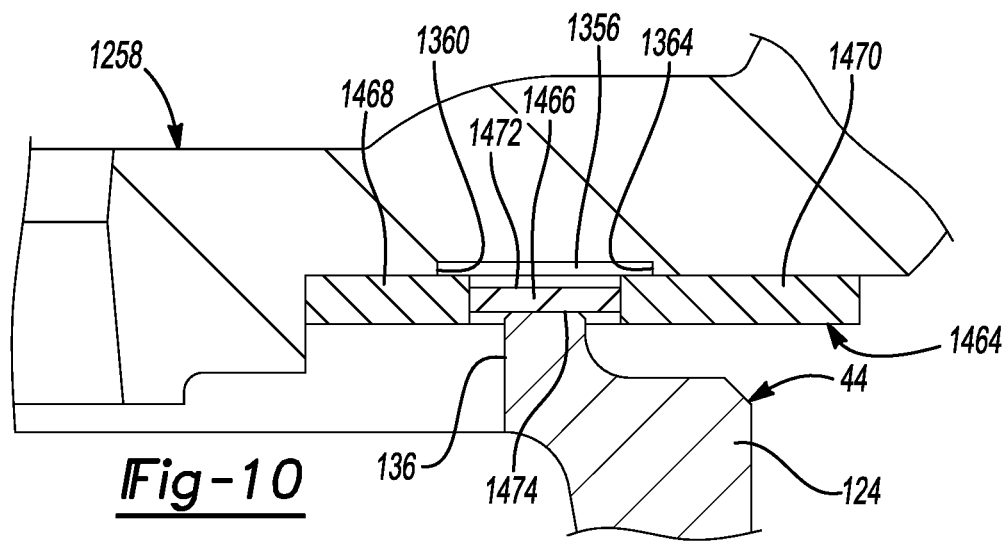
FIG. 10 is a cross-sectional view of a portion of yet another muffler plate, wear ring, and floating seal assembly according to the principles of the present disclosure.

FIG. 10 depicts another alternative wear ring 1464 that could be incorporated into the compressor 26 in place of the wear ring 64. While the wear ring 1464 is shown in FIG. 10 in conjunction with the muffler plate 1258, the wear ring 1464 could be used in conjunction with any of the muffler plates 58, 258, 458, 658, 858, 1058, 1258 described above.

The wear ring 1464 can be similar or identical to the wear ring 1264, except a radially intermediate portion 1466 of the wear ring 1464 may be thinner than radially inner and outer portions 1468, 1470 of the wear ring 1464. Like the radially intermediate portion 1266 described above, the radially intermediate portion 1466 may be formed from a different (e.g., softer or more flexible) material than the radially inner and outer portions 1468, 1470 of the wear ring 1464. Although, in some configurations, the radially intermediate portion 1466 may be formed from the same material as the radially inner and outer portions 1468, 1470 of the wear ring 1464. The radially intermediate portion 1466 may be partially or entirely disposed radially between inner and outer diametrical surfaces (or innermost and outermost edges) 1360, 1364 of the recess 1356.

The lip portion 136 of the seal assembly 44 may contact the radially intermediate portion 1466 of the wear ring 1464. The radially intermediate portion 1466 being thinner and formed from a more flexible material allows for a greater amount of deflection.

In the configuration shown in FIG. 10, a first surface 1472 of the radially intermediate portion 1466 is recessed below a first side of the radially inner and outer portions 1468, 1470, and a second surface 1474 of the radially intermediate portion 1466 is recessed above a second side of the radially inner and outer portions 1468, 1470. That is, the radially intermediate portion 1466 may define first and second recesses in opposite sides of the wear ring 1464. In some configurations, one side of the radially intermediate portion 1466 may be flush with one side of the radially inner and outer portions 1468, 1470.

Figure 11:
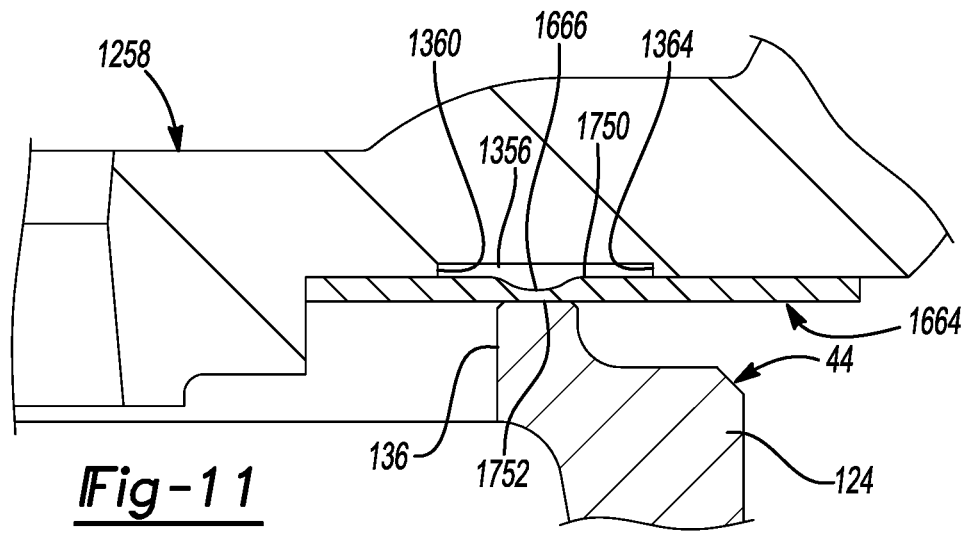
FIG. 11 is a cross-sectional view of a portion of yet another muffler plate, wear ring, and floating seal assembly according to the principles of the present disclosure.

FIG. 11 depicts another alternative wear ring 1664 that could be incorporated into the compressor 26 in place of the wear ring 64. While the wear ring 1664 is shown in FIG. 11 in conjunction with the muffler plate 1258, the wear ring 1664 could be used in conjunction with any of the muffler plates 58, 258, 458, 658, 858, 1058, 1258 described above.

The structure and function of the wear ring 1664 can be similar to that of the wear ring 64, except the wear ring 1664 may include a recess 1666 formed in a first surface 1750 of the wear ring 1664. The recess 1666 may be partially or entirely disposed radially between inner and outer diametrical surfaces (or innermost and outermost edges) 1360, 1364 of the recess 1356 in the muffler plate 1258. The lip portion 136 of the seal assembly 44 may contact a second surface 1752 of the wear ring 1664 at a location that is generally radially aligned with the recesses 1356, 1666. While the recess 1666 is shown in FIG. 11 as having a curved, U-shaped cross-section, the recess 1666 could have any other cross-sectional shape. Furthermore, in some configurations, the wear ring 1664 could have one or more recesses formed in the second surface 1752.

Figure 12:
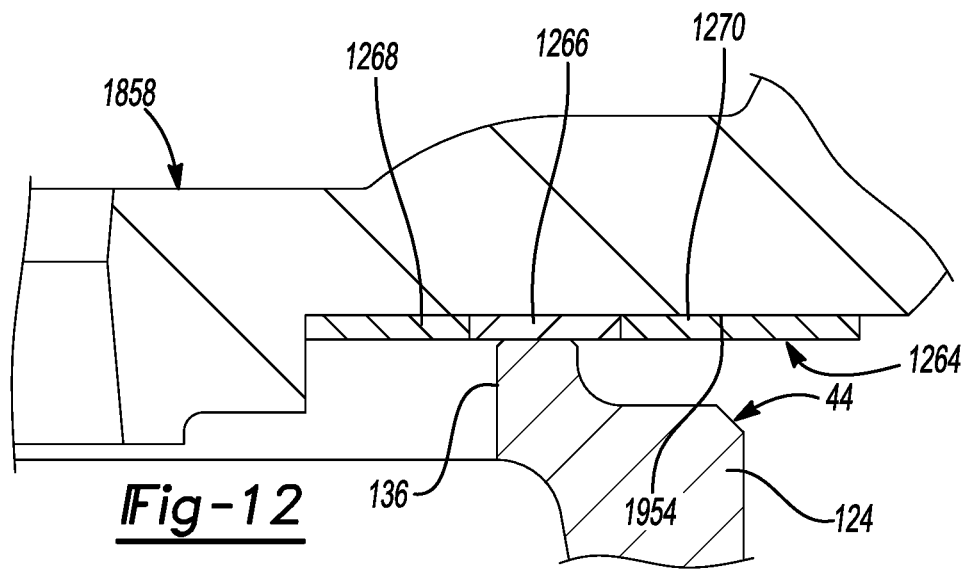
FIG. 12 is a cross-sectional view of a portion of yet another muffler plate, wear ring, and floating seal assembly according to the principles of the present disclosure.

Referring now to FIG. 12, another muffler plate 1858 is provided that may be incorporated into the compressor 26 in place of the muffler plate 58. The structure and function of the muffler plate 1858 may be similar or identical to that of the muffler plate 58, apart from differences described below. FIG. 12 depicts the muffler plate 1858 being used in conjunction with the wear ring 1264 described above.

The muffler plate 1858 includes an annular, axially facing surface 1954 that sealingly contacts the wear ring 1264. Unlike the surface 154 of the muffler plate 58, the surface 1954 of the muffler plate 1858 does not include a recess that is partially or completely covered by the wear ring 1264. Rather, only the softer, more flexible material of the radially intermediate portion 1266 of the wear ring 1264 provides the compliance (or ability to resiliently deflect) to maintain the sealed relationship between the wear ring 1264 and the muffler plate 1858 and between the wear ring 1264 and the seal assembly 44.

Figure 13:
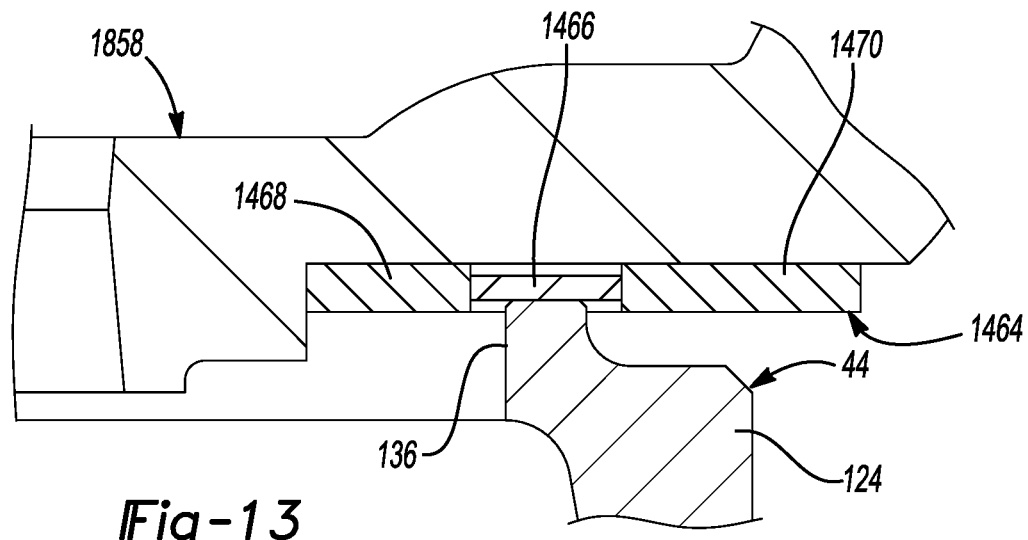
FIG. 13 is a cross-sectional view of a portion of yet another muffler plate, wear ring, and floating seal assembly according to the principles of the present disclosure.

FIG. 13 depicts the muffler plate 1858 being used in conjunction with the wear ring 1464. In this configuration, only the recesses defined by the radially intermediate portion 1466 and the softer, more flexible material of the radially intermediate portion 1466 of the wear ring 1464 provide the compliance (or ability to resiliently deflect) to maintain the sealed relationship between the wear ring 1464 and the muffler plate 1858 and between the wear ring 1464 and the seal assembly 44.

Figure 14:
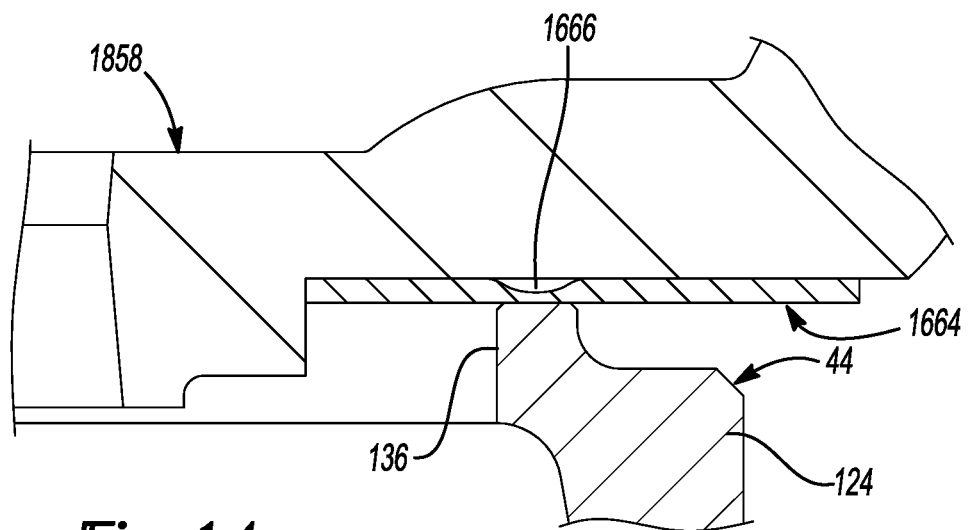
FIG. 14 is a cross-sectional view of a portion of yet another muffler plate, wear ring, and floating seal assembly according to the principles of the present disclosure.

FIG. 14 depicts the muffler plate 1858 being used in conjunction with the wear ring 1664. In this configuration, only the recess 1666 in the wear ring 1664 provides the compliance (or ability to resiliently deflect) to maintain the sealed relationship between the wear ring 1664 and the muffler plate 1858 and between the wear ring 1664 and the seal assembly 44.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A compressor comprising:
   a shell defining a discharge chamber and a suction chamber;
   a first scroll member disposed within the shell and including a first end plate and a first spiral wrap extending from the first end plate;
   a second scroll member disposed within the shell and including a second end plate and a second spiral wrap extending from the second end plate and meshingly engaged with the first spiral wrap;
   a floating seal sealingly engaging the second scroll member;
   a muffler plate defining the discharge chamber and the suction chamber; and
   a wear ring sealingly engaging the muffler plate and the floating seal such that the wear ring, the muffler plate, and the floating seal fluidly isolate the discharge chamber from the suction chamber,
   wherein the muffler plate includes an axially facing surface that contacts the wear ring, wherein the axially facing surface includes an annular recess formed therein, and wherein the wear ring at least partially covers the annular recess, and the annular recess provides clearance between the muffler plate and the wear ring to allow the wear ring to resiliently deflect relative to the muffler plate during operation of the compressor, and
   wherein the floating seal contacts a radially intermediate portion of the wear ring that is disposed radially between a radially innermost edge of the annular recess and a radially outermost edge of the annular recess.

2. The compressor of claim 1, wherein the wear ring extends radially across the entire annular recess such that the axially facing surface contacts the wear ring at a first location disposed radially inward relative to the annular recess and at a second location disposed radially outward relative to the annular recess.

3. The compressor of claim 2, wherein radially inner and radially outer portions of the wear ring are formed from a first material, and wherein the radially intermediate portion of the wear ring is formed from a second material that is more flexible than the first material.

4. The compressor of claim 3, wherein the wear ring includes an annular recess defined by the radially intermediate portion of the wear ring.

5. The compressor of claim 1, wherein the axially facing surface of the muffler plate contacts the wear ring at a location disposed radially outward relative to the annular recess, and wherein a radially central portion of the wear ring and a radially inner portion of the wear ring are aligned with the annular recess such that the radially central and radially inner portions of the wear ring are unsupported by the muffler plate.

6. The compressor of claim 1, wherein the axially facing surface of the muffler plate contacts the wear ring at a location disposed radially inward relative to the annular recess, and wherein a radially central portion of the wear ring and a radially outer portion of the wear ring are aligned with the annular recess such that the radially central and radially outer portions of the wear ring are unsupported by the muffler plate.

7. The compressor of claim 1, wherein the wear ring includes an annular recess defined by the radially intermediate portion of the wear ring.

8. The compressor of claim 7, wherein the annular recess in the wear ring is formed in a first side of the wear ring opposite a second side of the wear ring, and wherein the floating seal contacts the second side of the wear ring.

9. The compressor of claim 8, wherein the radially intermediate portion of the wear ring is formed from the same material as radially inner and radially outer portions of the wear ring.

10. The compressor of claim 1, wherein the radially intermediate portion of the wear ring is thinner than radially inner and radially outer portions of the wear ring.

11. A compressor comprising:
    a shell defining a discharge chamber and a suction chamber;
    a first scroll member disposed within the shell and including a first end plate and a first spiral wrap extending from the first end plate;
    a second scroll member disposed within the shell and including a second end plate and a second spiral wrap extending from the second end plate and meshingly engaged with the first spiral wrap;
    a floating seal sealingly engaging the second scroll member;
    a muffler plate defining the discharge chamber and the suction chamber; and
    a wear ring sealingly engaging the muffler plate and the floating seal such that the wear ring, the muffler plate, and the floating seal fluidly isolate the discharge chamber from the suction chamber,
    wherein the muffler plate includes an axially facing surface that contacts the wear ring, wherein radially inner and radially outer portions of the wear ring are formed from a first material, and wherein a radially intermediate portion of the wear ring is formed from a second material that is different from the first material.

12. A compressor comprising:
    a shell defining a discharge chamber and a suction chamber;
    a first scroll member disposed within the shell and including a first end plate and a first spiral wrap extending from the first end plate;
    a second scroll member disposed within the shell and including a second end plate and a second spiral wrap extending from the second end plate and meshingly engaged with the first spiral wrap;

a floating seal sealingly engaging the second scroll member;

a muffler plate defining the discharge chamber and the suction chamber; and a wear ring sealingly engaging the muffler plate and the floating seal such that the wear ring, the muffler plate, and the floating seal fluidly isolate the discharge chamber from the suction chamber, wherein the muffler plate includes an axially facing surface that contacts the wear ring, wherein a radially intermediate portion of the wear ring defines an annular recess in the wear ring, wherein the annular recess in the wear ring is formed in a first side of the wear ring opposite a second side of the wear ring, and wherein the floating seal contacts the second side of the wear ring.

13. The compressor of claim 12, wherein the floating seal contacts the radially intermediate portion of the wear ring.

14. The compressor of claim 12, wherein radially inner and radially outer portions of the wear ring are formed from a first material, and wherein the radially intermediate portion of the wear ring is formed from a second material that is different from the first material.

15. The compressor of claim 14, wherein the second material is more flexible than the first material.

16. The compressor of claim 12, wherein the radially intermediate portion of the wear ring is thinner than radially inner and radially outer portions of the wear ring.

17. The compressor of claim 12, wherein the axially facing surface of the muffler plate defines another annular recess that is at least partially radially aligned with the annular recess in the wear ring.

18. The compressor of claim 17, wherein the wear ring extends radially across the entire annular recess in the muffler plate such that the axially facing surface contacts the wear ring at a first location disposed radially inward relative to the annular recesses of the muffler plate and the wear ring and at a second location disposed radially outward relative to the annular recesses of the muffler plate and the wear ring.

* * * * *